United States Patent [19]

Hansen

[11] 4,412,267

[45] Oct. 25, 1983

[54] TIME-DELAY CURRENT SENSING CIRCUIT BREAKER RELAY

[75] Inventor: James E. Hansen, Oak Creek, Wis.

[73] Assignee: Eaton Corporation, Cleveland, Ohio

[21] Appl. No.: 350,790

[22] Filed: Feb. 22, 1982

Related U.S. Application Data

[63] Continuation of Ser. No. 119,055, Feb. 6, 1980, abandoned.

[51] Int. Cl.³ .................. H02H 3/08; H02H 3/093
[52] U.S. Cl. .................................. 361/94; 361/92; 361/104; 361/31; 335/152
[58] Field of Search .................... 361/93-96, 361/31, 104, 92, 97, 28, 195-198; 335/152, 154, 301; 307/141, 293

[56] References Cited

U.S. PATENT DOCUMENTS

| | | | |
|---|---|---|---|
| 3,289,128 | 11/1966 | Else | 335/152 |
| 3,294,987 | 12/1966 | Skrbina | 361/93 X |
| 3,309,571 | 3/1967 | Gilker | 361/94 X |
| 3,434,080 | 3/1969 | Mengelberg | 335/154 |
| 3,471,813 | 10/1969 | Neuber | 335/152 |
| 3,538,386 | 11/1970 | Schweitzer, Jr. | 361/93 X |
| 3,814,948 | 6/1974 | Schuchmann et al. | 307/141 |
| 3,970,908 | 7/1976 | Hansen | 318/221 E |
| 4,006,443 | 2/1977 | Kouchich et al. | 361/104 X |
| 4,103,317 | 7/1978 | Krick | 361/31 |
| 4,214,288 | 7/1980 | Cavil et al. | 361/92 X |

Primary Examiner—Patrick R. Salce
Attorney, Agent, or Firm—C. H. Grace; W. A. Autio

[57] ABSTRACT

A circuit control device combining the functions of a current sensor, a time delay circuit, an undervoltage sensor, and a lockout such that, once tripped, the device must be reset intentionally. The current sensor includes a coil (16a) surrounding two reed switches (18, 20), the reed elements (18a, 20a) of each of which being perpendicular to those of the other for vibration resistance. The coil is then surrounded by a magnetic shield (28) in order to shield out some of the leakage flux from the main relay coil (14c). The time delay circuit includes a PUT (Q1) which compares a steady voltage from a voltage divider network with the increasing voltage across a capacitor (C3). The undervoltage sensor includes a second PUT (Q3) which compares the voltage of the DC source (10) with the steady voltage across a zener diode (D5). In each case the cathode of the PUT is connected to the gate of an SCR (Q2) which, when gated "ON," energizes the trip coil (24c) of the latching relay (24), which in turn opens the main relay (14). This also closes another set of contacts (24e, 24f) in the latching relay, which activates a visual "tripped" indicator. The device also includes a reset coil (24d) to reclose the latching relay, an override switch (SW3) to energize the main relay coil regardless of the status of the latching relay, and an energy-storing capacitor (C2) to power the time delay circuit even when the DC source voltage drops too low to do so.

15 Claims, 4 Drawing Figures (4,412,267)

TIME-DELAY CURRENT SENSING CIRCUIT BREAKER RELAY

This is a continuation of James E. Hansen copending application Ser. No. 119,055, filed Feb. 6, 1980, now abandoned.

BACKGROUND OF THE INVENTION

This invention pertains generally to relays which also perform circuit protective functions, such as those used as battery-to-electrical-system contactors in aircraft applications, and in particular to circuit breaker relays which trip open due to an overcurrent condition only after a predetermined period of time-delay.

There have been many circuits designed to be protective from certain conditions after a time delay. One example of such a circuit is Nurnberg et al U.S. Pat. No. 4,042,964, issued Aug. 16, 1977. The circuit there described, however, as well as others, did not provide all of the functions of an overcurrent sensor, a time delay circuit and an undervoltage sensor which control a latching relay which in turn controls a main relay.

Hansen et al U.S. Pat. No. 3,970,908, issued July 20, 1976, discloses the use of a reed switch to perform the function of a current sensor. This design, however, is subject to false indication of overcurrent due to vibration, and is thus unsuited to many applications.

An arrangement of several reed switches oriented at right angles to each other is disclosed in Neuber U.S. Pat. No. 3,471,813, issued Oct. 6, 1969. No means is there disclosed, however, to construct a vibration-resistant current sensor from those reed switches.

SUMMARY OF THE INVENTION

The invention includes a dual reed current sensor, a time delay circuit, a latching relay which can be tripped and reset, and a main relay controlled by the latching relay. An alternative embodiment also includes an undervoltage sensor for opening the main relay if the battery voltage falls below acceptable levels. The current sensor includes two reed switches within the same coil which are connected in series. The two reed switches are mounted such that the reeds of one are perpendicular to those of the other, to provide greater resistance to false trips due to vibration.

An object of the invention is to provide a time delay circuit breaker relay.

Another object of the invention is to provide a relay as described above wherein threshold overcurrent conditions are sensed bilaterally by a dual reed current sensor.

Another object of the invention is to provide a relay as described above including a sensor which opens the relay when the voltage in the system drops below a predetermined level.

A more specific object of the invention is to provide a relay as described above which is resistant to vibration due to orthogonal mounting of the reeds of the dual reed current sensor, and due to solid state construction of logic functions.

Another specific object of the invention is to provide a relay as described above which has a differential between the level of trip current in one direction and that in the other direction.

Another specific object of the invention is to provide a relay as described above wherein the time delay and undervoltage sensing are provided by electronic circuits.

Other features of this invention include an override function for intentionally inhibiting the current sensor function when high currents are anticipated for periods exceeding the internal delay period; a lockout function once the main relay is tripped; a reset function; and provision for indication of "tripped" condition.

Other objects and advantages will hereinafter appear.

DESCRIPTION OF THE PREFERRED EMBODIMENTS

Figure 1:
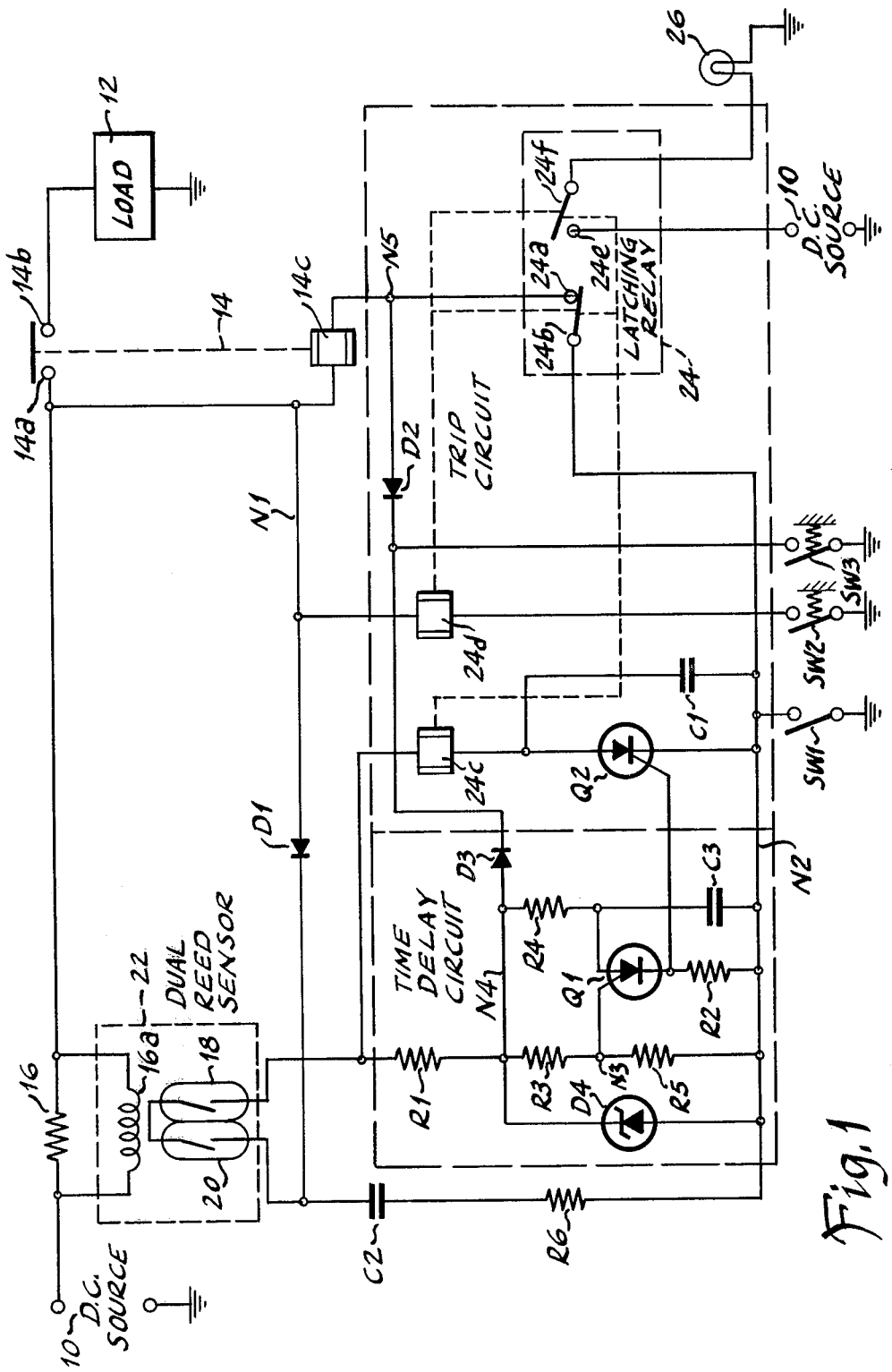
FIG. 1 is a diagrammatic view of a circuit constructed according to the invention.

Referring to FIG. 1, the circuit embodying this invention includes a D.C. source 10 connected in series with a load 12 through the contacts 14a and 14b of a main relay 14. In the line between source 10 and the main relay contacts is a tapped shunt 16. Connected in parallel with shunt 16 is a coil 16a for sampling the current passing through the line at that point at any one time. The respective currents through the shunt 16 and coil 16a are in inverse proportion to their respective resistances. Thus the amount of current passing through the coil 16a can be increased by increasing the resistance of the shunt or decreasing the resistance of the coil. And this ratio of currents can be preserved over a wide range of temperature by constructing both the shunt and the coil of the same metal.

Figure 2:
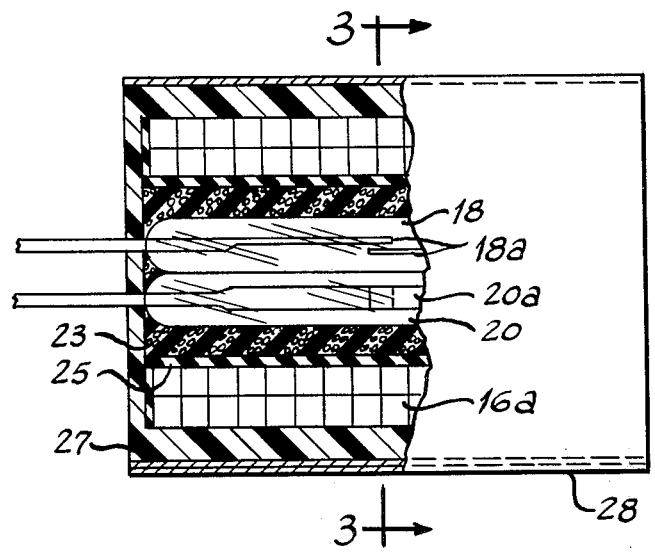
FIG. 2 is a side view of the reed switches, coil, and magnetic shield, with the coil and magnetic shield partially cut away.
Figure 3:
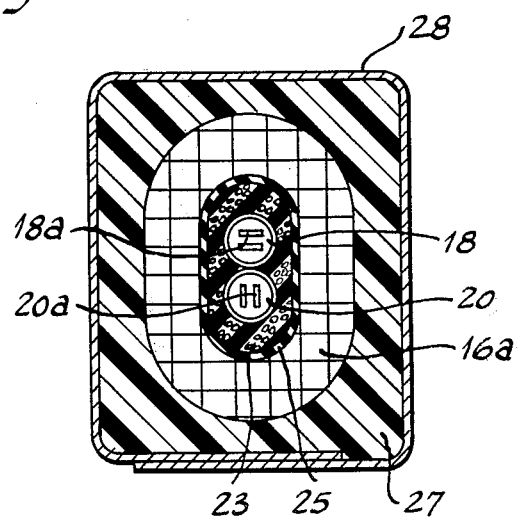
FIG. 3 is a cross-sectional view of FIG. 2 taken along line 3—3.

Coil 16a has an air core, in which are inserted two reed switches 18 and 20. These two reed switches are connected in series. Their long axes are arranged in parallel relation, side by side, as shown in FIG. 2, with the reed elements of one rotated 90 degrees with respect to those of the other, so that the reed elements 18a and 20a of the two switches are perpendicular to each other, as shown in FIG. 3. Thus vibration in any one plane will not be orthogonal to both reed switches. Hence, with the two reed switches connected in series, the combination is much more resistant to false trip due to vibration or shock impulse than would a single reed switch be.

The shunt 16, coil 16a and reed switches 18 and 20 make up the dual reed current sensor 22.

As illustrated in FIGS. 2 and 3, immediately surrounding the two reed switches is a layer of soft, spongy material 23 to insulate the switches from mechanical shock and vibration. This layer is surrounded by a bobbin 25 upon which coil 16a is wound. A layer of epoxy 27 is then applied to the coil, and the entire assembly is inserted into a magnetic shield 28.

One of the reed switches 20 of the current sensor 22 is connected through a diode D1 to the node N1 between the unswitched side 14a of the main relay contacts and shunt 16. Diode D1 is oriented to allow current to flow to the reed sensor, not away from it. The same reed switch 20 is connected to ground through a capacitor C2, a resistor R6 and a switch SW1. Node N2 is the node between resistor R6 and switch SW1.

Reed switch 18 is connected to node N2 through the time delay circuit, which includes a voltage divider made up of three resistors R1, R3 and R5. Zener diode D4 is connected in parallel with resistors R3 and R5 to regulate the voltage thereacross. Connected to the node N3 between resistors R3 and R5 is the gate of a programmable unijunction transistor (PUT) Q1. The anode of Q1 is connected to the node N4 between resistors R1 and R3 through a resistor R4, and to node N2 through a capacitor C3. The cathode of Q1 is connected to node N2 through a resistor R2, and is connected directly to the gate of a semiconductor-controlled rectifier (SCR) Q2. The cathode of SCR Q2 is connected to node N2.

One end of the coil 14c of the main relay 14 is connected to node N1, while the opposite end of coil 14c, as shown in FIG. 1, is connected to a contact 24a of latching relay 24. The opposite contact 24b of relay 24 is then connected to node N2. Since relay 24 is a latching relay, separate coils are needed to open and close it. Trip coil 24c of relay 24, which opens these contacts when energized, is connected between reed switch 18 and the anode of SCR Q2. A capacitor C1 is connected between the anode and cathode of SCR Q2 to prevent voltage transients from accidentally forcing Q2 into conduction. Set coil 24d, which closes contacts 24a and 24b when energized, is connected between node N1 and a momentary switch SW2, which connects the set coil circuit to ground when closed.

The operation of this circuit breaker relay can be described as follows: Assuming latching relay 24 is closed, closing the switch SW1 closes the main relay 14, and opening the switch opens the relay. Closing switch SW1 also causes capacitor C2 to charge. The purpose of capacitor C2 is to provide current to the time delay circuit and trip circuit in case the voltage level of the DC supply 10 falls too low to do so due to an overload. Resistor R6 is a low level resistance put into the circuit to fuse open should capacitor C2 short out, so that C2 would then be removed from the circuit.

On the occurence of a predetermined overload level of current, the dual reed current sensor closes due to the force created in the coil surrounding the reed switches. This energizes the time delay circuit such that the voltage at the gate of PUT Q1 is set at the voltage across resistor R5 whereas the voltage across capacitor C3, which is the anode voltage of PUT Q1, begins to increase. The time required for the voltage across capacitor C3 to reach the voltage across R5 is determined by the values of R3, R4, R5 and C3. When that voltage is reached, PUT Q1 sends a pulse of current to the gate of SCR Q2 which, in turn, energizes the trip coil 24c of the latching relay 24, opening relay 24, which finally opens main relay 14 by de-energizing its coil 14c.

In addition, latching relay 24 has another set of contacts 24e and 24f, which are always open when contacts 24a and 24b are closed, and vice versa. One of these contacts 24e and 24f is connected to DC source 10, while the other is connected through a lamp 26 to ground the function of which is to indicate a tripped condition when contacts 24a and 24b open, since contacts 24e and 24f would then be closed.

Another momentary switch SW3 is connected through a diode D2 to the node N5 between the main relay coil 14c and latching relay contact 24a, and through another diode D3 to node N4 to shunt the time delay circuit to ground and reset the same. Switch SW3 is an "override" switch. When this switch is closed, the main relay coil 14c is directly energized, and the main relay 14 is closed, regardless of the condition of the rest of the circuit. Thus it is possible, by using this switch, to inhibit the current sensor and trip function on certain occasions when high currents are anticipated for periods exceeding the period of the time delay circuit, such as during start-up of certain types of loads. Since the main relay is energized directly, it can be energized even if the device has been tripped and not subsequently reset.

An additional feature of this current sensor is that it is bidirectional, that is, the reed switches 18 and 20 close at the same current level regardless of the current polarity. If a differential between the trip current in one direction and that in the other is desirable, however, this can be accomplished by use of an additional unidirectional source of magnetic flux, positioned near the reed switches. This source of flux could be a permanent magnet, a separate coil added for that purpose, or preferably the main relay coil, which creates sufficient additional unidirectional leakage flux to result in a sufficient differential. The actual amount of the differential can be controlled by the shape and thickness of the shield 28 shown in FIGS. 2 and 3.

Figure 4:
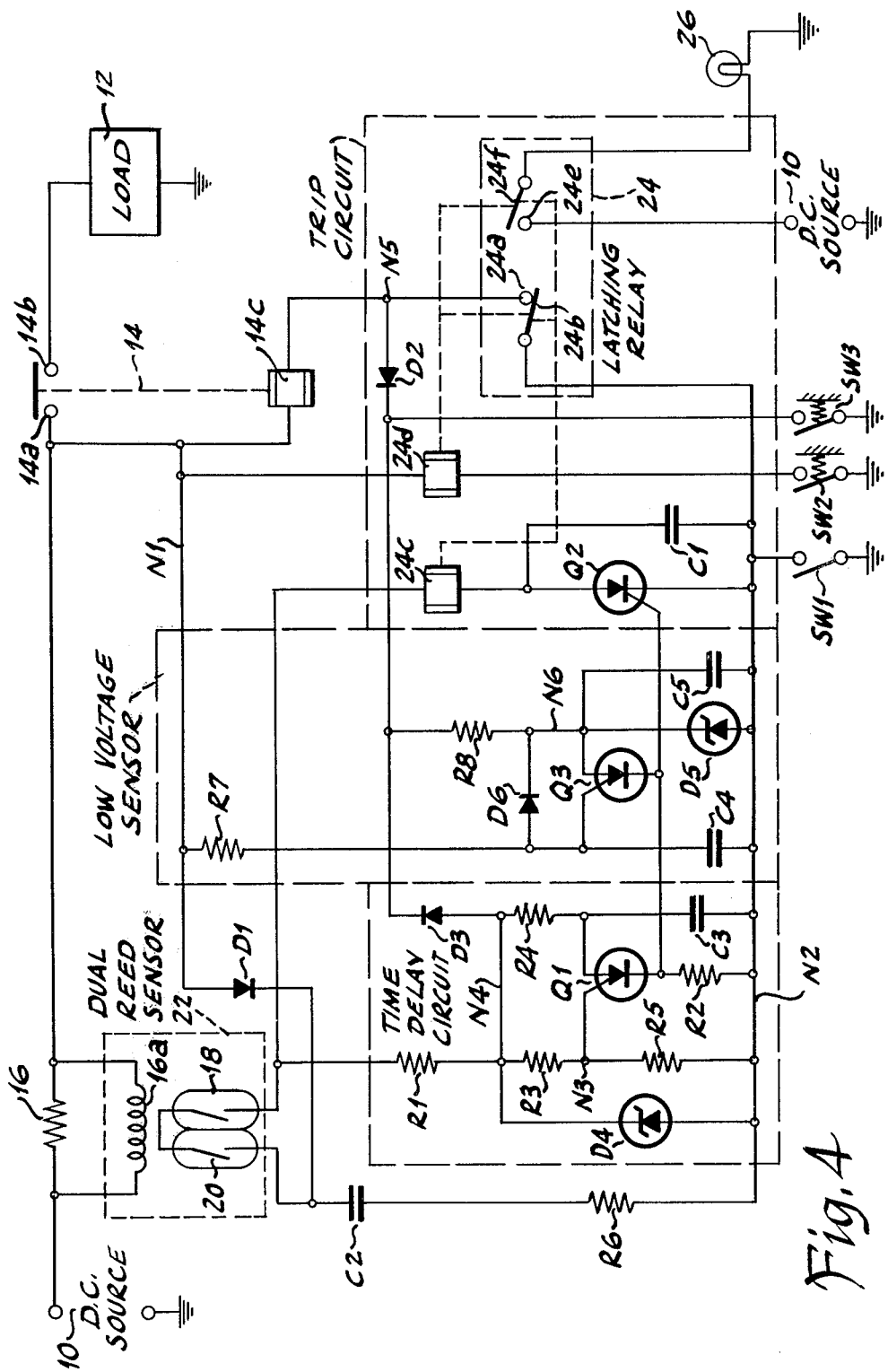
FIG. 4 is a diagrammatic view of a circuit constructed according to an alternate form of the invention.

An alternate embodiment of the invention is shown in FIG. 4. The circuit there illustrated is similar to that shown in FIG. 1, except that a low voltage sensor has been added to open the main relay 14 in the event that a massive overload draws the voltage of the DC source 10 below the relay's hold-in voltage before the time delay circuit opens the relay.

This low voltage sensor circuit includes a resistor R7 connected to node N1, and connected through a capacitor C4 to node N2. Connected to the junction between resistor R7 and capacitor C4 are the anode of a diode D6 and the gate of a second PUT Q3. The cathode of PUT Q3 is connected in parallel with the cathode of PUT Q1 to the gate of SCR Q2. The cathode of diode D6 is connected to the anode of PUT Q3 to form a node N6. The cathode of a diode D5 is connected to node N6, while the anode is connected to node N2. A capacitor C5 is connected in parallel with diode D5. Finally, a resistor R8 is connected between node N6 and override switch SW3.

In operation, the voltage of the DC source 10 appears across capacitor C4, that is, between the gate of PUT Q3 and node N2. Meanwhile, a constant voltage, less than the DC source voltage, regulated by zener diode D5, appears between the anode of PUT Q3 and node N2. When the DC source voltage drops to less than the voltage across zener diode D5, as could happen during a severe fault, PUT Q3 becomes conductive, allowing capacitor C5 to force a pulse of current into the gate of SCR Q2, making it conductive. This energizes the trip coil 24c, opening the main relay 14 as previously described.

It should be recognized and understood that various modifications of the invention herein described are possible without departing from the scope of the appended claims.

What is claimed is:

1. A circuit breaker relay, comprising:
   an electrical DC battery power supply source;
   a load circuit including power switching means controllable to connect said source to a load;
   a pilot switch operable to control said power switching means for energization and deenergization of said load;

current sensing means comprising normally open reed relay contact means operable to close for indicating that the current flowing in said load circuit has reached a predetermined level; and circuit control means connected through said reed relay contact means to the power supply source side of said power switching means for opening said power switching means in response to said indication from said current sensing means that said current has reached said predetermined level;

said circuit control means comprising a time delay circuit and a trip circuit normally without supply power, said time delay circuit responding to closure of said contact means for precisely providing a predetermined time delay and then signaling said trip circuit, which in turn deenergizes said power switching means, disconnecting said load from said source;

and energy storage means connected to the power supply source side of said power switching means for supplying operating voltage through said reed relay contact means to said time delay circuit and said trip circuit in the event the voltage of said DC battery source should drop low on a high overload.

2. A circuit breaker relay as recited in claim 1, further comprising low voltage trip means for sensing the voltage of said source and signaling said trip circuit to deenergize said power switching means when the voltage of said source falls below a predetermined low level, regardless of the indication of said current sensing means and the signal of said time delay circuit.

3. A circuit breaker relay as recited in claim 2 wherein said trip circuit comprises:

visual indication means for indicating that said power switching means has been deenergized by said trip circuit;

a latching relay having two sets of contacts arranged such that whenever one set of contacts is closed, the other set is open, the first set of contacts being connected to energize said power switching means, and the second set of contacts being connected to energize said visual indication means;

trip control semiconductor switching means having anode, cathode and gate terminals;

a trip coil connected in series with said semiconductor switching means such that on receipt by said semiconductor switching means of said signal from said time delay circuit or said low voltage trip means, said trip coil is energized, opening said first set of contacts and closing said second set of contacts;

manual switching means;

a reset coil connected in series with said manual switching means, such that when said manual switching means is closed, said reset coil is energized, closing said first set of contacts and opening said second set of contacts.

4. A circuit breaker relay as recited in claim 3 further comprising a coil on said power switching means, and an override circuit including an override switch connected to said coil of said power switching means, such that when said override switch is closed, said coil is energized regardless of the condition of said first set of contacts of said latching relay.

5. A circuit breaker relay as recited in claim 3 wherein said time delay circuit comprises:

time delay semiconductor switching means having a gate terminal, an anode terminal and a cathode terminal, said cathode terminal being connected to the gate terminal of said trip control semiconductor switching means of said trip circuit;

voltage divider means for supplying a constant voltage to said gate terminal of said time delay semiconductor switching means;

and resistance-capacitance means connected to said anode terminal of said time delay semiconductor switching means such that when the voltage across said capacitance reaches the voltage supplied to said gate terminal thereof, a pulse of current is sent from said cathode terminal thereof to said trip control semiconductor switching means of said trip circuit, said pulse of current constituting said signal from said time delay circuit to said trip circuit.

6. A circuit breaker relay as recited in claim 5 wherein said low voltage trip means comprises:

low voltage control semiconductor switching means having a gate terminal, an anode terminal and a cathode terminal, said cathode terminal thereof being connected to the gate terminal of said trip control semiconductor switching means of said trip circuit; and a zener diode for supplying a constant voltage to said anode terminal of said low voltage control semiconductor switching means;

said DC battery power supply source being connected to said gate terminal of said low voltage semiconductor switching means such that when the voltage supplied to said gate terminal thereof by said source drops below that supplied to said anode thereof, a pulse of current is sent from said cathode terminal thereof to said trip control semiconductor switching means of said trip circuit, said pulse of current constituting said signal from said voltage trip means to said trip circuit.

7. A circuit breaker relay as recited in claim 1, further comprising unidirectional conducting means connected between said energy storage means and said DC battery source for preventing return of the energy from said energy storage means to said source.

8. A circuit breaker relay as recited in claim 1 further comprising an impedance in series with said energy storage means for fusing open in the event that said energy storage means shorts, such that said energy storage means is removed from the circuit.

9. A circuit breaker relay as recited in claim 1 wherein said current sensing means comprises a reed relay having a coil for sensing the current in said load circuit and said normally open contact means serving as a switching means.

10. A circuit breaker relay as recited in claim 9 wherein said normally open contact means comprises a pair of reed switches connected in series and having reed elements, the reed elements of one of said reed switches being arranged in perpendicular relation with respect to the reed elements of the other of said reed switches, such that said normally open contact means is more resistant to closure due to vibration than a single reed switch or a plurality of reed switches having parallel elements.

11. A circuit breaker relay as recited in claim 10 wherein said current sensing means comprises:

a source of unidirectional magnetic flux providing a differential between the trip currents in opposite directions in said load circuit;

wherein said reed switches are physically located sufficiently close to said source of unidirectional flux that its operation is affected by said flux;

and magnetic shielding means between said source of unidirectional flux and said reed relay for controlling the degree that said reed switches are affected by said flux.

12. A circuit breaker relay as recited in claim 11 wherein said source of unidirectional flux comprises a coil connected across said DC source for providing said flux.

13. A circuit breaker relay as recited in claim 11 wherein said power switching means is a relay having normally open switching means and a coil which produces flux including leakage flux, said coil being said source of unidirectional magnetic flux.

14. A circuit breaker relay as recited in claim 7 wherein said source of unidirectional flux comprises a permanent magnet for providing said flux.

15. A circuit breaker relay comprising:
an electrical DC power supply source;
a load circuit including power switching means controllable to connect said source to a load;
a pilot switch operable to control said power switching means for energization and deenergization of said load;

current sensing means for indicating that the current flowing in said load circuit has reached a predetermined overload level;

said current sensing means comprising a reed relay having a coil connected to the power supply source side of said power switching means for sensing the overload current in said load circuit and a pair of reed switches connected in series and having the plane of closure motion of the reed elements of one of said reed switches arranged at a right angle relative to the plane of closure motion of the reed elements of the other reed switch so as to be effectively shock and vibration resistant;

circuit control means connected to the power supply source side of said power switching means for opening the latter on said indication from said reed relay that said current has reached said predetermined overload level;

and said circuit control means comprising a time delay circuit and a trip circuit, said time delay circuit comprising means for precisely providing a predetermined time delay and then signaling said trip circuit which thereupon deenergizes said power switching means whereby to disconnect said load from said source.

* * * * *